United States Patent [19]

Miller

[11] 4,063,139
[45] Dec. 13, 1977

[54] TAPE DRIVE MOTOR CONTROL CIRCUIT

[75] Inventor: Donald E. Miller, Waynesboro, Va.

[73] Assignee: General Electric Company, Waynesboro, Va.

[21] Appl. No.: 567,913

[22] Filed: Apr. 14, 1975

[51] Int. Cl.² ............................ B65H 23/20; H02P 5/00
[52] U.S. Cl. ......................................... 318/331; 318/7; 318/77; 242/184
[58] Field of Search ................... 318/6, 7, 331, 71, 77; 242/184

[56] References Cited

U.S. PATENT DOCUMENTS

| | | | |
|---|---|---|---|
| 2,881,374 | 4/1959 | Anger | 318/77 X |
| 3,478,985 | 11/1969 | Tobey | 242/184 |
| 3,604,992 | 9/1971 | Audeh | 318/7 X |
| 3,673,473 | 6/1972 | Werner | 318/6 X |
| 3,704,401 | 11/1972 | Miller | 318/7 |
| 3,734,426 | 5/1973 | Howes et al. | 318/7 X |

Primary Examiner—B. Dobeck
Attorney, Agent, or Firm—Michael Masnik

[57] ABSTRACT

An arrangement for controlling the speed of payoff and winding reels and an associated capstan drive in a recording and reproducing arrangement during start up, running and stopping operations employing the application of control signals to the capstan and reel motors which include novel, combined use of capstan motor armature counter-electromotive force, reference signals and capstan motor terminal voltage.

21 Claims, 5 Drawing Figures

TAPE DRIVE MOTOR CONTROL CIRCUIT

BACKGROUND OF THE INVENTION

This invention relates generally to electronic controls for controlling the starting, running and stopping of motors, and more particularly to capstan and reel drive motors and circuitry therefor as used in recording and reproducing digital information on tape.

The recording and reproduction of information on recording tape in industry has been increasing at a tremendous rate. There is a growing need for providing such recording and reproduction systems at low cost. Problems associated with providing low cost systems are that in order for the recorded tape to be played on different reproduction systems, it must be recorded at substantially the same speed. Many prior art arrangements exist for controlling the speed at which tape is run off a payoff reel and wound up on a winding reel. Generally this has involved controlling the speeds of the individual motors driving the payoff and winding reels. One common way for controlling the speeds of the winding and payoff reels employs a capstan and pinch wheel arrangement for driving the tape. By regulating the rotational speed of the capstan motor, one regulates the linear rate at which the tape moves past the recording and reproduction heads. In such an arrangement it is necessary to control the peripheral velocity of the reels to be identical to that of the capstan. One way of maintaining the capstan motor speed constant is to regulate the CEMF (counter-electromotive force) developed by this motor and to maintain a predetermined tension on the winding and payoff reels by controlling the armature motor current associated with the payoff and winding reels. The latter controls the torque delivered by the motors and hence the tension in the tape. One way of substantially reducing the costs involved in the manufacture of drive systems for a tape recorder and reproducer, i.e. tape transports, is to employ less expensive adjustable speed DC motors to drive the reels. Unfortunately when this is done, certain difficulties are encountered. Starting, stopping and running characteristics of inexpensive motors may vary from one motor to another in an undesirable manner because of differing motor armature resistance. Also, the inexpensive motors tend to have relatively higher rotational friction. Because of this, the torque delivered to the reels by the motors will vary differently for different motors. The consequences of such undesirable motor characteristics, if not accommodated, is that tape may be unduly stressed and break, or a loop of tape caused to accumulate which could foul up tape movement or result in tape breakage when the tape is suddenly tensioned at the instant the slack is eliminated.

Accordingly, it is one object of this invention to provide an improved motor drive system for recording and reproducing devices which will enable the use of less expensive motors.

It is another object of this invention to accommodate adjustable speed DC motors and enable them to operate in recording and reproduction devices in an acceptable manner.

It is another object of this invention to provide an improved arrangement for reeling ribbon on and/or off a spool.

It is another object of the present invention to provide an improved tape transport comprising only a single capstan motor and two low cost reel motors.

It is another object of this invention to provide improved capstan and reel motor drive circuitry for coordinated starting and stopping, as well as improved circuitry for increasing the torque applied to the winding reel as its diameter increases.

Another object of this invention is to provide improved tape transport control circuitry for controlling tension on tape being driven along its length by a first motor of relatively high quality and being accumulated on a winding reel driven by a winding motor and paid off a payoff reel driven by a payoff motor during starting, running and stopping.

Another object of this invention is to provide improved tape transport circuitry that is easily utilized to operate in a fast wind/rewind (forward/reverse) mode with controlled inter-reel tension during starting, running and stopping.

A further object of this invention is to provide improved tape transport circuitry in which the tape drive motor parameters are used as a reference for the winding and payoff reel motor drives to reflect load changes to the reels, which load changes include the reflection of starting and running conditions to the winding reel motor and stopping conditions to the payoff reel motor.

Still another object of this invention is to provide improved tape transport control circuitry via a regulator which is a current regulator at read/write speeds and which automatically converts into a terminal voltage regulator at fast wind/rewind (forward/reverse) speeds.

Still another object of the invention is to provide an improved motor control employing regenerative drag in the payoff reel for course speed regulation at fast wind/rewind (forward/reverse) speeds.

BRIEF DESCRIPTION OF THE DRAWING

The features of the present invention believed to be novel are set forth with particularity in the appended claims. The function itself, however, both as to organization and method of operation, together with further objects and advantages thereof, may best be understood by reference to the following description taken in conjunction with the accompanying drawing in which:

DESCRIPTION OF THE INVENTION

Figure 1:
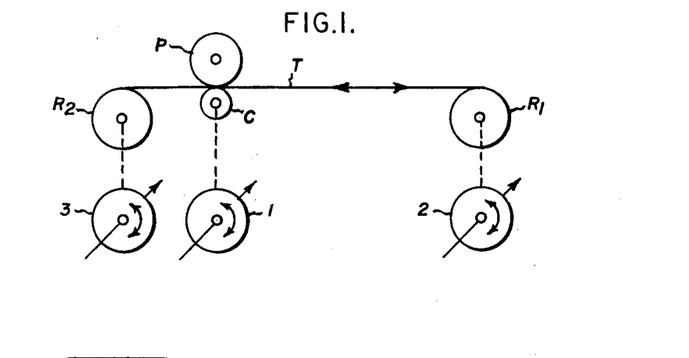
FIG. 1 illustrates schematically an arrangement of reels and a capstan operated by a respective motor for moving a tape or ribbon material.

Turning now to a description of the environment in which one embodiment of the invention applies, FIG. 1 illustrates an arrangement for moving tape T between two reels. The arrangement includes a single capstan motor 1 driving a capstan C, a reel motor 2 driving a reel R1 and a second reel motor 3 driving a reel R2. The three motors are inexpensive, variable speed, DC motors which are reversible by changing the polarity of the applied voltage. The arrows indicate the variable speed, variable direction nature of these motors. Since the motor control circuitry to be described drives the recording tape in both directions, it is apparent that either of the reel motors 2, 3 may be considered the winding motor or the payoff motor. In a winding mode, the winding motor develops a winding or driving torque to increase tape motion whereas in the payoff mode, the payoff motor develops a payoff or dragging torque to decrease tape motion.

Figure 2:
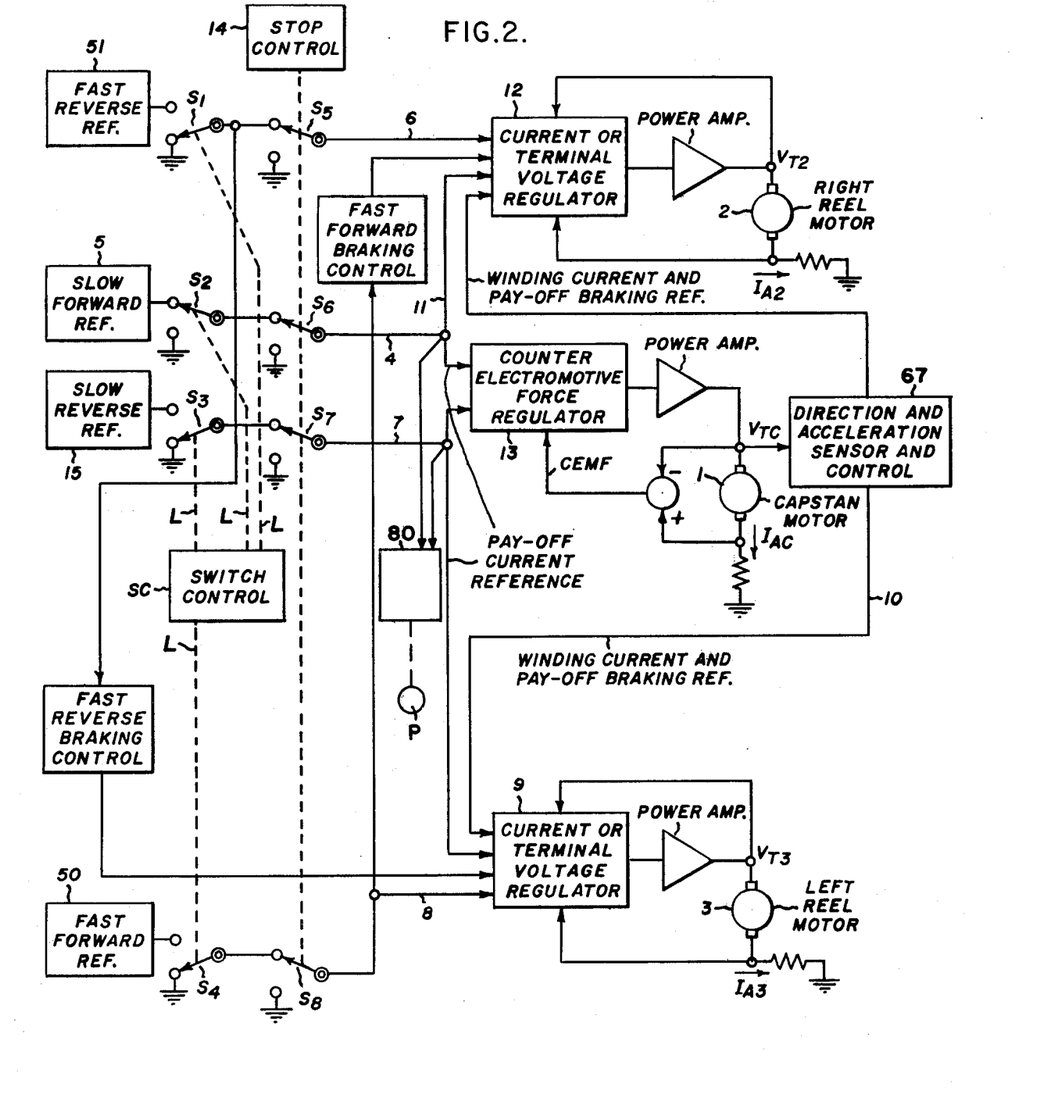
FIG. 2 illustrates in simplified block diagram form features of the present invention.

Briefly, it is desired to move tape or ribbon material between two reels R1 and R2 under control of motors 1, 2 and 3 and capstan C. Referring to FIG. 2, the invention to be described is concerned with moving tape in one or the other direction at a slow speed established by switches S2 or S3 and also at a fast speed established by switches S1 or S4 at the discretion of a user. There are two types of reel operation. A read/write mode occurs at the slow speed and involves capstan drive of the tape by pinch wheel action and a wind/rewind mode which occurs at a high speed and is independent of capstan operation. Switches S1 through S4 are interconnected, shown by dotted line linkage L such that when one of the switches, operated by switch control SC, is connected to a positive or negative voltage, the others are grounded. In addition, a pinch wheel P is engaged by means of pinch wheel actuator 80 with the tape and capstan only when a switch is connected to a positive or negative voltage associated with slow speed operation, and is disengaged when the switch is connected to a zero voltage.

Referring to FIG. 2 there are shown, in simplified form, the general features of the present invention. This system uses one capstan motor 1 and allows the use of reel motors 2 and 3 with much higher running friction. In one embodiment the running friction of the reel motors was of the order of ten times greater than the relatively higher quality tape drive or capstan motor and the cost of the reel motor was of the order of one-sixth of that of the capstan motor. A novel feature of this system is the use of interconnecting circuits which provide for coordinated starting and stopping as well as an increasing torque, during running, applied to the winding reel as its coil of tape builds up. This feature provides a controlled tension on the tape between capstan and each reel while starting, running and stopping at the read/write speed which in a particular embodiment was chosen to be 10 inches/second. Another feature of the system is that it is easily utilized to operate in the fast wind/rewind speed with a controlled inner-reel tension in starting, running and stopping. In one embodiment this fast speed was chosen to be 120 inches per second. The capstan motor 1 is employed to drive right reel motor 2 in the payoff mode and left reel motor 3 in the winding mode upon operation of switch control SC to cause S2 to connect lead 4 and hence CEMF regulator 13 to the slow forward reverse reference signal source 5 and leads 6, 7 and 8 to a source of zero reference potential, i.e. ground. The capstan terminal voltage $V_{TC}$ is applied as a reference over lead 10 to regulator 9 operating as a current regulator for the winding reel motor 3. The signal available on lead 4 as a capstan speed reference is also applied over lead 11 as the reference for the regulator 12 operating as a current regulator for the payoff reel motor 2. As the diameter of the payoff reel decreases, it will provide a greater load on the capstan. The capstan regulator will compensate by increasing its terminal voltage and in doing so will increase the current and hence the driving torque in the winding reel motor. The application of a constant reference signal over lead 11 results in regulator 12 maintaining the current to and hence the payoff torque developed by payoff motor 2 constant. As will be explained shortly, a resistor-capacitor phase lag circuit is used in the reference of the winding reel current regulator 9 to match the starting characteristics of the winding reel and capstan motors 3 and 1. This circuit also provides a slow decay of developed winding torque when stopping. When switch S3 is switched to slow reverse reference 15, while switches S1, S2, S4 are switched to ground, the tape is driven in the opposite direction with the roles of motor 2 and 3 interchanged.

To initiate a stop, stop control 14 is operated to drive all of switches S5, S6, S7, S8 to ground, thereby placing all of leads 4, 6, 7 and 8 at ground or zero potential. Thus, a zero speed reference is applied to the capstan regulator 13 to implement a stop and to disengage the capstan motor from driving the tape by disengaging the pinch wheel. The zero speed reference will cause the capstan terminal voltage to reverse. By the use of diodes, this reversal is applied by 67 to the payoff reel motor 2 which causes it to act like a brake. A resistor-capacitor circuit is used to distribute this stopping effort being applied to the payoff reel motor 2 over a sufficient length of time to insure uniform stopping of both reels. This stopping action is realized for both directions of tape travel.

To run the reel motors in the fast wind or forward mode, a large voltage reference signal is applied over lead 8 from source 50 by switch S4 to the winding reel regulator 9 which is caused to operate as a voltage regulator for winding reel motor 3. With switch S4 switched to fast forward reference 15, all the other switches S1, S2, S3 are grounded. Grounding leads 4 and 7 operates, as will be shown shortly, to de-energize capstan motor 1 and to disconnect it from tape engagement through disengagement of an associated pinch wheel. The winding reel reference is of a magnitude sufficient to drive the regulator operational amplifier into a limit which is set by a Zener diode associated therewith. The regulator will hold the amplifier in this limit thus setting the magnitude of the winding reel terminal voltage. As the payoff reel is pulled by the winding reel, the payoff motor operates as a generator to generate a counter-electromotive force or internal voltage which attempts to generate armature current. However, current regulator 12 will try to hold this armature current at zero by raising the associated amplifier output and thus the bucking or opposing voltage. The amplifier output will increase until it is driven into a limit determined by a Zener diode associated therewith converting the regulator to a voltage regulator. This diode thus determines the payoff motor armature terminal or bucking voltage allowed to be generated. The limiting action provides dragging torque when the speed of the payoff reel is high but automatically decreases or even removes the drag as the speed is slowed by any increase in friction. The result of this varied dragging action is to provide a course nonlinear speed regulation. When switch S1 is switched to fast reverse reference 51, while switches S2, S3, S4 are switched to ground, the tape is driven in the opposite direction, with the roles of motors 2 and 3 interchanged.

When a stop is initiated by operation of stop control 14, grounding all input leads 4, 6, 7 and 8, the reference to the winding reel motor 3 is reduced to zero causing its armature current to be reduced to zero and thus providing no braking action on the winding reel motor 3. The payoff reel regulator 12 now operating as a current regulator however is provided with a reference, which will be described shortly, which will momentarily increase its braking current and cause this braking current to slowly decay to zero. The decay time is controlled by a resistor-capacitor discharging time constant circuit to be described.

To facilitate description of the invention, the following table and associated key of symbols will be employed. The control of the three motors, namely the capstan motor and the two reel motors, is described in terms of the mode of motor operation, the controlling signals and the associated voltage or current regulators. The control is also described in terms of motor starting, running and stopping, and also for slow and fast speed operation for both forward and reverse motor rotation directions.

power amplifier 17 which amplifies this signal before applying it to the capstan motor 1. Thus, depending on the polarity of the signal applied by 61 or 62, the amplifier 17 drives the motor 1 in one or the other direction. In order to have the motor 1 operate at substantially constant speed despite changes in load, it is necessary to change the terminal voltage as a function of load change.

In the description that follows it will be assumed that the circuitry is operating so that capstan motor 1 removes tape from the reel coupled to reel motor 2 and winds it upon the reel attached to motor 3.

The speed of the capstan motor 1 is regulated by its

| | SLOW SPEED (READ/WRITE) OPERATION | | | | | | |
|---|---|---|---|---|---|---|---|
| I. | STARTING AND RUNNING | | | | | | |
| Mode | Capstan Motor 1 | Motor 2 | Motor 3 | S2 | S3 | S4 | S1 |
| Forward | engaged S2; via CEMF regulator | payoff mode S2; control via $I_{A2}$ regulator | winding mode $V_{TC}$ modified by TCC; control via $I_{A3}$ regulator | +15 | 0 | 0 | 0 |
| Reverse | engaged S3; via CEMF regulator | winding mode $V_{TC}$ modified by TCC; control via $I_{A2}$ regulator | payoff mode S3; control via $I_{A3}$ regulator | 0 | −15 | 0 | 0 |
| II. | STOPPING | | | | | | |
| Mode | Capstan Motor 1 | Motor 2 | Motor 3 | S2 | S3 | S4 | S1 |
| Forward | disengaged | braking $V_{TC}$ modified by TCC; control via $I_{A2}$ regulator | coasts S2 modified by TCC; control via $I_{A3}$ regulator | 0 | 0 | 0 | 0 |
| Reverse | disengaged | coasts S3 modified by TCC; control via $I_{A2}$ regulator | braking $V_{TC}$ modified by TCC; control via $I_{A2}$ regulator | 0 | 0 | 0 | 0 |
| | FAST SPEED (WIND/REWIND) OPERATION | | | | | | |
| III. | STARTING AND RUNNING | | | | | | |
| Mode | Capstan Motor 1 | Motor 2 | Motor 3 | s2 | S3 | S4 | S1 |
| Forward | disengaged | payoff mode S2, S1; control via $V_{T2}$ regulator | winding S4; control via $V_{T3}$ regulator | 0 | 0 | −13 | 0 |
| Reverse | disengaged | winding S1; control via $V_{T2}$ regulator | payoff S3, S4; control via $V_{T3}$ regulator | 0 | 0 | 0 | +13 |
| IV. | STOPPING | | | | | | |
| Mode | Capstan Motor 1 | Motor 2 | Motor 3 | S2 | S3 | S4 | S1 |
| Forward | disengaged | braking S4, modified by TCC; control via $I_{A2}$ regulator | coasts S4; control via $I_{A3}$ regulator | 0 | 0 | 0 | 0 |
| Reverse | disengaged | coasts S1; control via $I_{A2}$ regulator | braking S1; modified by TCC; control via $I_{A3}$ regulator | 0 | 0 | 0 | 0 |

KEY TO SYMBOLS
S1 - 0, +13
S2 - 0, +15
S3 - 0, −15
S4 - 0, −13
CEMF - counter-electromotive force of capstan motor
$V_{TC}$ - terminal voltage of capstan motor
$V_{T2}$ - terminal voltage of reel motor 2
$V_{T3}$ - terminal voltage of reel motor 3
$I_{AC}$ - armature current associated with capstan motor
TCC - time constant circuit
$I_{A2}$ - armature current associated with motor 2
$I_{A3}$ - armature current associated with motor 3

The invention shown in FIG. 3 will now be discussed in considerable detail. A signal of the appropriate polarity appearing at either reference leads 4 or 7 is applied to a CEMF (counter-electromotive force) regulator 60 where the signal after being adjusted to the appropriate levels by either of resistors 61 and 62 and also the potentiometer 20 is applied to the input of an operational amplifier 16. The signal, either positive or negative depending upon whether forward or reverse tape drive is desired, passes from the regulator 60 to a CEMF. This is accomplished by using the algebraic sum of the capstan motor armature terminal voltage and the current through the motor as feedback into the operational amplifier. Hence, a feedback line 63 is interconnected between one terminal of the capstan motor 1 and the regulator 60 for applying the signal representing the capstan terminal voltage through a resistance 22 to a summing junction 64 and then to the inverting input of operational amplifier 16. A signal representing the armature current flowing through resistor 25 is coupled by conductor 65 to operational amplifier 24 through coupling resistor 66. Resistor 25 having a value substantially smaller than the motor armature resistance is coupled between the lower terminal of motor 1 and ground. The signal representing the armature current is applied through the resistance 66 and after amplification in an operational amplifier 24 through a resistor 23 to the summing junction conductor 64. Resistor 22 provides a signal representing the motor terminal voltage and resistor 23 a signal representing the motor armature current. The algebraic sum of these two signals appears on 21 as a signal representing the motor CEMF. The signal representing the CEMF feedback developed by summing the capstan motor terminal voltage and the value representing the capstan motor armature current is algebraically summed with the reference signal developed at resistors 61 or 62 in combination with potentiometer 20. In the drawing, it will be noted that resistor 22 in the terminal voltage feedback circuit is bypassed by a resistor 18 in series with a capacitor 19. This integrating circuit is intended to improve the starting and stopping characteristic of motor 1. Essentially, it cancels the pole determined by the motor time constant. In one embodiment, resistor 18 had a value of approximately 120K ohms and the capacitor 19 a value of 0.22 microfarads. The amplifier 24 operates to provide the required gain and polarity of an armature current feedback signal for proper combination with the signal representing the terminal voltage. The algebraic sum of the CEMF signal and the selected reference signal is amplified in high voltage gain amplifier 16 and then in power amplifier 17 before application to the terminal of motor 1. Thus as the load changes, the terminal voltage is changed to maintain motor speed substantially constant.

The load on motor 1 is a function of the tension in tape T between motors 1 and 3 and between motors 1 and 2. It is desirable to control the currents applied to motors 2 and 3 during the startup, stopping and running of the tape, in both directions, under control of capstan motor 1 in order to control the tension in the tape T. The arrangement to be described employs the capstan motor armature terminal voltage to control the current applied to motor 3 during its startup and running mode when motor 1 is operating in a slow forward direction with switch S2 energized with a reference voltage and to control the current applied to motor 2 during its startup and running mode when motor 1 is operating in a slow reverse direction with switch S3 energized with a reference voltage.

The reference signal applied over lead 4 to the capstan regulator 60 is also applied over lead 82 to the payoff motor current regulator 12. Regulator 12 responds to the reference signal developed on lead 82 and the feedback signal on lead 70 representing payoff motor armature current to produce a signal which after amplification in power amplifier 27 controls the current developed in motor 2 which in turn controls the payoff torque developed by motor 2. In the slow forward mode therefore, the winding and payoff current regulators respond to signals representing the capstan terminal voltage and a fixed reference voltage respectively to control the winding and payoff torque developed by motors 3 and 2 respectively.

So far we have described how the capstan motor 1 has its speed controlled by the CEMF regulator during its running mode. When the reels are running at the normal slow speed necessary for reading or recording, it is necessary to regulate the armature current at both the payoff motor 2 and the winding reel motor 3. The reference signal for the winding reel motor 3 is obtained from the direction and acceleration sensor and control 67 which samples the capstan motor armature terminal voltage and passes signals of negative polarity over lead 10 to winding reel regulator 9 operating as a current regulator. In one embodiment each leg of the sensor and control 67 comprises a resistance 31 of 5.6K ohms in series with a diode 32 with appropriate polarity and a resistance 33 of 6K ohms. A capacitor 34 of 5 microfarads was connected between ground and the junction of diode 32 and resistor 33. A phase lag is provided by the resistances and capacitors to match the starting characteristics of the capstan and reel motors and to aid in a coordinated stop of the reel and capstan motors. Under the conditions outlined, the signals applied to the current regulator 9 are a signal on lead 10 representing the capstan armature terminal voltage and a signal on lead 68 representing the winding motor armature current. Regulator 9 responds to these inputs to apply a control signal to the power amplifier 69 which controls the current developed in motor 3 which in turn controls the winding torque developed by motor 3.

During startup when, for example, lead 4 is energized, pinch wheel actuator 72 is energized to cause the capstan motor to begin engaging the tape in a driving force relationship. Simultaneously CEMF regulator 60 responds to the reference voltage available on lead 4 in the absence of a CEMF feedback signal on lead 21 to produce a signal of considerable amplitude which when amplified by amplifier 17 causes a relatively high terminal voltage to be applied to motor 1 to accelerate it. This transient or peak terminal voltage is also coupled through components 31a, 32a, 33a and 34a of control 67 to lead 10 to cause regulator 9 and amplifier 69 to develop a high starting current in motor 3. The values of the previously mentioned components of control circuit 67 are dimensioned to cause the starting characteristics of motors 1 and 3 to be compatible to bring the tape up to speed without any slack or undesirable tension. Diode 32b of control 67 prevents the transient signal developed across motor 1 to be applied to regulator 12 during the start of the slow forward mode. Regulator 12 responds to the reference signal available on lead 82 to develop a signal after amplification in 27 to provide a desired drag torque on motor 2 during the startup mode.

During stopping, the pinch wheel actuator 72 responds to disengage the capstan drive and all the reference signals available on leads 4, 6, 7 and 8, of course, go to zero potential. The regulator 60 responds to a zero voltage reference signal and a CEMF signal developed on lead 21 to produce a high intensity stopping pulse which after amplification in amplifier 17 results in a reversal and development of a high intensity terminal voltage across motor 1. This results in a controlled stopping of motor 1. The high intensity terminal voltage pulse of reverse polarity causes diode 32a to be back-biased. The charge previously developed on capacitor 34a which was related to the terminal voltage being developed across motor 1 is applied over lead 10 to regulator 9. The signal on lead 10 coupled with the feedback signal developed on 68 results in a controlled decay of the current flowing through motor 3 and a decay in the winding torque with time. The same high intensity terminal voltage signal of reverse polarity is coupled through the components 31b, 32b, 33b and 34b over lead 71 to payoff motor regulator 12. Current regulator 12 responds to the zero reference signal developed on lead 82 and the high intensity signal available on 71 representing a stopping transient terminal voltage of motor 1 to produce a high intensity signal which after amplification in 27 results in a high intensity braking current being developed in motor 2. The time constant of the components 31b, 32b, 33b and 34b of control 67 are dimensioned to extend the period of application of the capstan motor terminal voltage over lead 71 over a sufficient length of time to insure uniform stopping of both reel motors.

Figure 3:
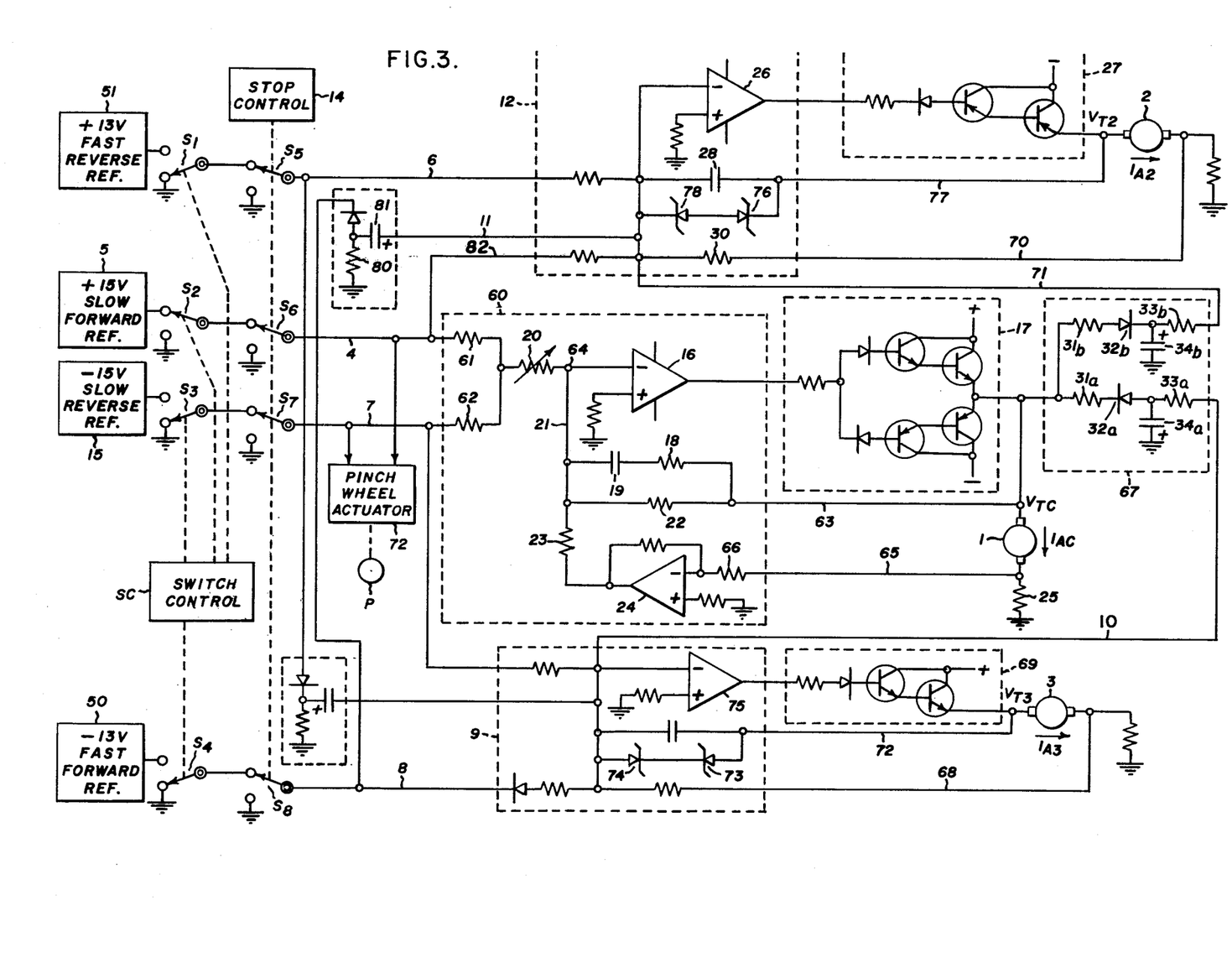
FIG. 3 illustrates circuitry for controlling the operation of the arrangement of FIG. 2.

The arrangement of FIG. 3 operates in a similar manner for the low reverse mode when the switch S3 is switched to the −15 volts available from source 15 with the other switches S1, S2 and S4 grounded but with the roles of the motors 3 and 2 interchanged. That is, motor 2 now becomes the winding reel and motor 3 the payoff reel.

To run the reel motors in the fast wind or forward mode as previously mentioned, a large voltage reference signal is applied over lead 8 from source 50 by switch S4 to the winding reel regulator 9. Since the voltage on leads 4 and 7 is at zero volts, the capstan motor is effectively disconnected during the fast wind-/rewind (forward/reverse) mode and hence no reference signal is available on lead 10. Regulator 9 responds to the relatively high intensity reference signal available on lead 8 and the feedback signal developed on lead 68 to develop a signal which when amplified in amplifier 69 produces a terminal voltage for motor 3. This terminal voltage is fed back over lead 72 through Zener diodes 73 and 74 to the inverting terminal of operational amplifier 75. The terminal voltage on 72 is coupled directly through the forward biased Zener diode 73 and continues to build up until the Zener voltage of 74 is reached. Zener 74 therefore limits the amplitude of the voltage developed on lead 72. Thus feedback path 72, Zener diode 74 and amplifier 75 effectively result in a voltage regulation action to control the terminal voltage developed for motor 3. With the terminal voltage of motor 3 being held constant, the speed of motor 3 will vary with the drag imposed on motor 3 due to the drag torque developed by motor 2 and the friction associated with tape movement. As the payoff reel is pulled by the winding reel, the payoff motor generates a counter-electromotive force which attempts to generate armature current. However, the current regulator will try to hold its armature current at zero by raising the associated amplifier output and the bucking or opposing voltage. Terminal voltage is fed back over feedback lead 77 through Zener diodes 76 and 78 to the inverting terminal of amplifier 26. Zener diodes 76 and 78 operate as previously mentioned with respect to 73 and 74 with Zener diode 76 controlling the terminal voltage developed for motor 2. In one embodiment this operation resulted in the terminal voltage for motor 3 being maintained at 9 volts whereas that for motor 2 was maintained at 2.3 volts. The result of having substantially constant terminal voltages developed for motors 3 and 2 is that the armature current for motor 3 will increase as tape is being wound up on motor 3 indicating increased winding torque. Control circuits for motor 2 are dimensioned such that the drag developed by motor 2 with motor 3 acting as a winding motor is proportional to the angular speed of the payoff reel. In one embodiment these characteristics resulted in a rewind of tape using reel motors of relatively high friction in 25 to 30 seconds.

During the startup the control circuit for motor 3 operates as indicated. However, motor 2 has associated with it a time constant circuit comprising resistor 80 and condenser 81. This circuit senses changes in reference signal on lead 8 and develops a transient voltage which is applied as a reference signal to regulator 12 during the startup condition. During the startup phase regulator 12 is still operating as a current regulator. The effect of the transient reference signal being supplied by 80, 81 is to delay momentarily the conversion of the current regulator 12 to a voltage regulator. This, in effect, delays the development of a drag torque on motor 2 during the startup period and results in motor 2 being brought up to speed more quickly.

During stopping in the fast forward mode the voltage reference on lead 8 goes to zero. This causes regulator 9 to revert back to a current regulator thus driving the armature current through winding motor 3 to zero promptly. A circuit comprising resistor 80 and condenser 81 again senses the change in reference signal developed on lead 8 causing the application of a transient signal to the regulator 12. This causes the voltage regulator 12 to revert back to a current regulator once again. The payoff reel regulator 12 then will momentarily increase the braking current applied to motor 2 and cause braking current to slowly decay to zero. Decay time is controlled by the values of the resistor-capacitor discharging time constant circuits of 80 and 81.

Figure 4A:
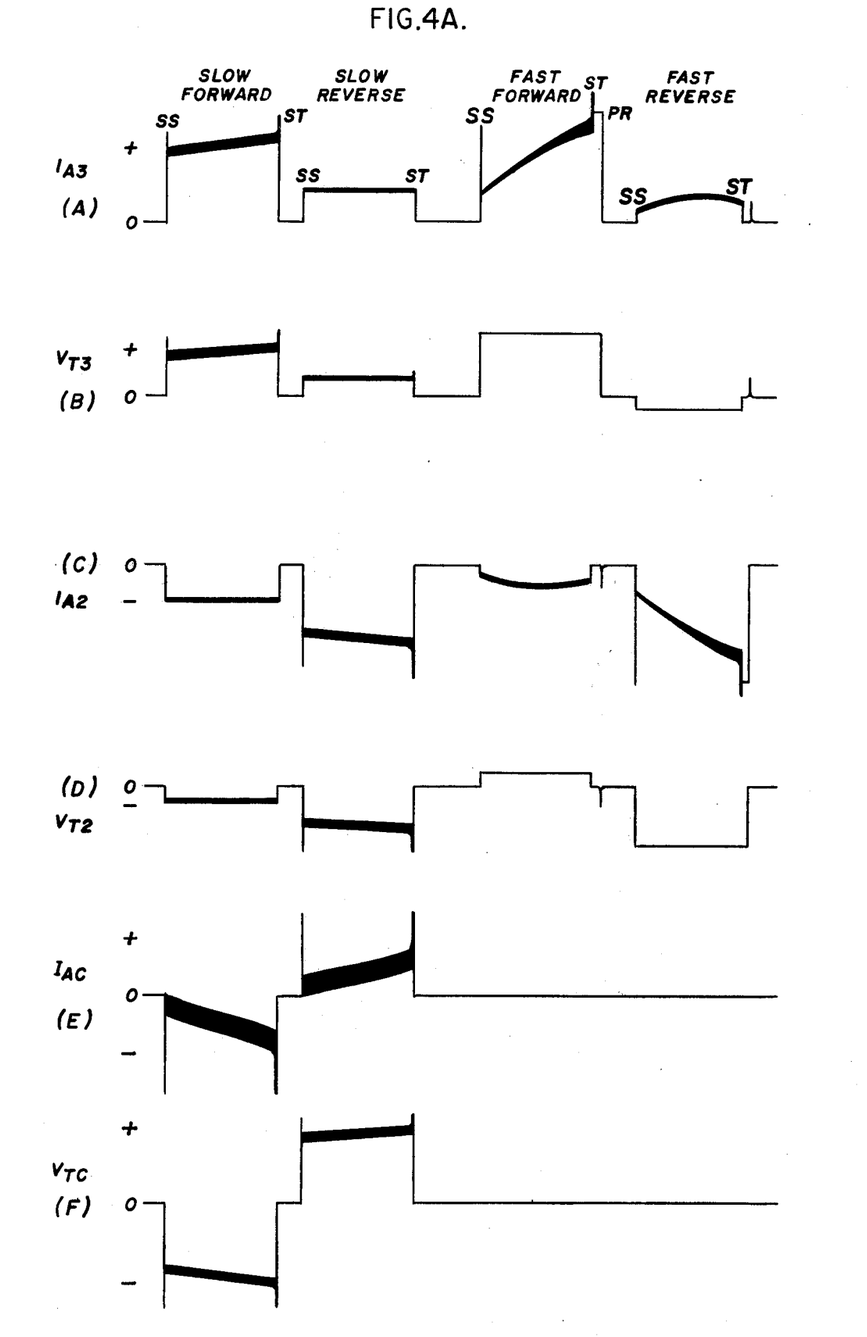
FIG. 4A and 4B illustrate graphically the operation of the present invention.
Figure 4B:
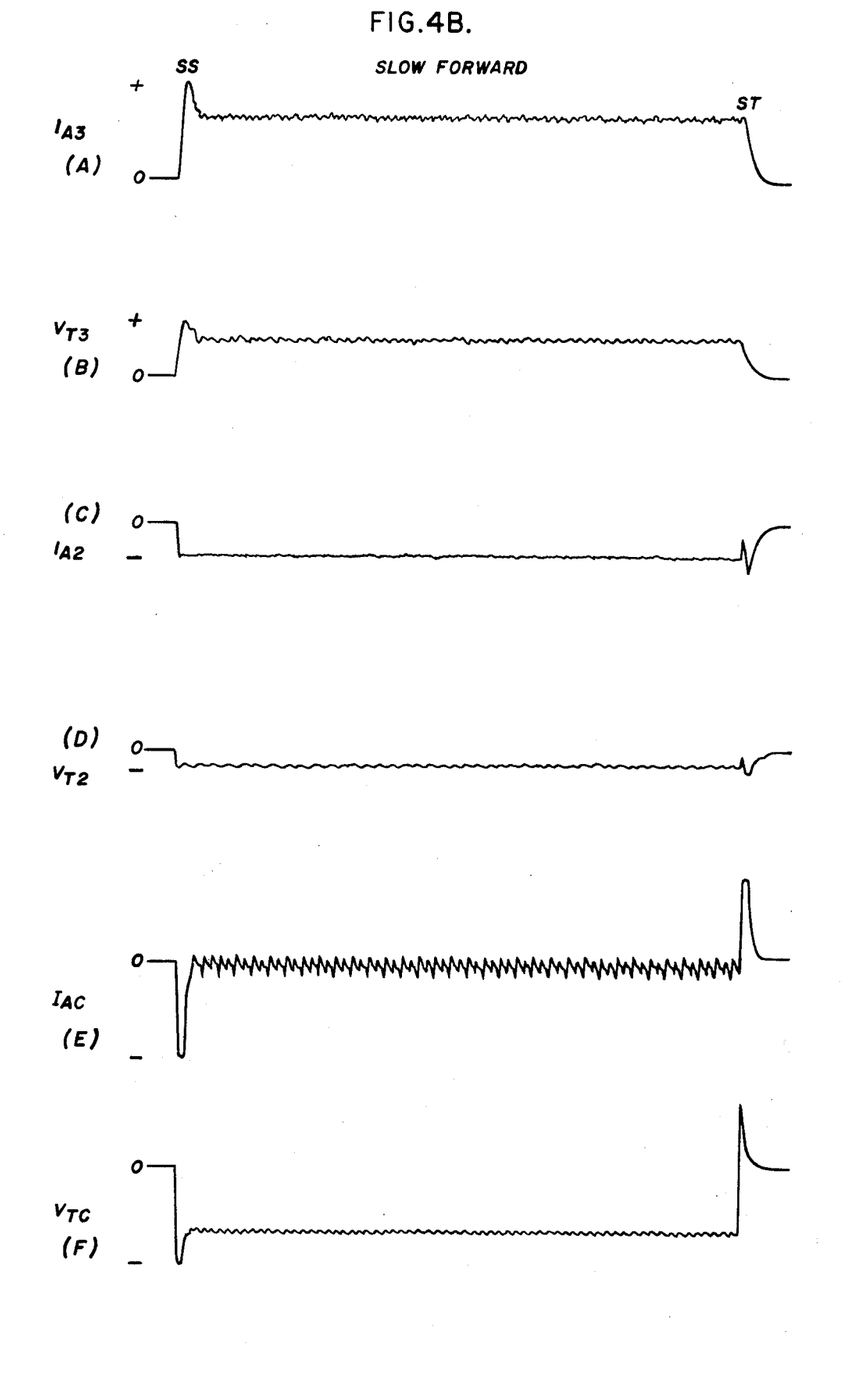

FIGS. 4A and 4B illustrate graphically how the arrangements of FIG. 2 and FIG. 3 operate to control the speeds of the capstan and reel motors. FIG. 4A illustrates how the armature currents and terminal voltages of motors 1, 2 and 3 vary from starting SS to stopping ST. The intensity of the parameter is plotted as ordinate and time as the abscissa. The time period between starting and stopping in the slow speed modes is of the order of 6 minutes whereas that in the fast speed modes is of the order of 30 seconds. The rising characteristic of $I_{A3}$ during slow forward indicates that tape is being wound up on the reel associated with motor 3. The solid lining in the curves represents the range of changing parameter intensity as a result of motor commutator induced ripple. Graph F illustrates that for slow forward, the capstan terminal voltage is an increasing voltage with time resulting in an increasing current and voltage waveform for motor 3 as shown in graphs A and B. Motor 2 has substantially a flat current and voltage characteristic is shown in graphs C and D since it is being referenced against a constant +15 volts supplied by S2.

Graphs E and F show that the capstan motor is disengaged during fast forward. Graph B shows the motor 3 energized with a constant voltage as a result of being referenced against −13 volts and the operation of Zener diode 74 which results in its armature current rising as shown in graph A as the tape builds up on the reel associated therewith. With a zero reference voltage, the voltage at motor 2 is constant as a result of terminal voltage regulation of motor 2 as shown in graph D. Graph C shows the combined effects of tape being unwound from the reel associated with motor 2 and the change in inter-reel speed during this fast mode. In looking at graph A, fast forward, ST indicates that the tape has stopped but the power to the winding reel was not removed until a short time PR later, resulting in motor 3 being stalled. At ST with motor power still on, $I_{A3}$ increased substantially but $I_{A2}$ went to zero because motor 2 no longer was rotating under a condition of zero armature current reference signal. When power was removed from motor 3 by grounding switch S4, motor 3 armature current went to zero. The current for motor 2 as shown in graph C exhibits a negative going peak attributed to the RC time constant established by 80 and 81 normally used for stopping.

FIG. 4B illustrates a brief period during slow forward operation, including starting and stopping when tape existed on both reels with most of the tape on the reel R2 which is the payoff reel. The ripples shown are due to commutator action and illustrates how the terminal voltage in graph B changes to maintain a substantially constant armature current as shown in graph A. In graph A, the positive going peak at time SS and extending for some 40 milliseconds represents the current required to accelerate the reel while the capstan motor is being engaged. When the power to motor 3 is removed by grounding switch S4 at time ST, it is desirable to gradually reduce the armature current to zero as shown. This is accomplished by the fact that diode 32a is reverse biased by change in polarity of $V_{TC}$ enabling the charge on condenser 34a to be discharged in a controlled manner through resistor 33a. Graph C shows that the braking current which would go to zero because S2 was grounded, is in fact increased in the negative direction by operation of the charge in polarity of $V_{TC}$, shown in graph F, acting through 31b, 32b, 33b and 34b. This enables braking current to exist for a short period after the switches have been operated. The resulting braking current in graph C comprises an initial current component developed through 31b, 32b and 33b and a later component as the result of the discharge of condenser 34b through resistor 33b. This results in a longer duration and smoother current wave to zero which is desirable for smooth tape stopping.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

What I claim as new and desire to secure by Letters Patent of the United States is:

1. A tape drive comprising a source of a constant first reference voltage of predetermined amplitude, a winding reel, a direct current winding reel motor for driving said winding reel, a winding motor armature current regulator, a direct current capstan motor, a capstan motor armature counter electromotive force regulator, said capstan regulator responsive to said reference voltage for driving said capstan motor at a substantially constant speed and in a first direction, and said winding motor regulator responsive to the terminal voltage of said capstan motor for controlling the winding torque exerted by said winding reel motor on said winding reel.

2. An arrangement according to claim 1 further comprising a payoff reel, a direct current payoff reel motor for driving said payoff reel, a payoff motor armature current regulator, said payoff regulator responsive to said reference voltage for controlling the payoff torque exerted by said payoff reel motor on said payoff reel.

3. The tape drive claimed in claim 2 wherein said capstan regulator comprises means for producing a signal representing said reference voltage, a signal representing capstan motor terminal voltage and a signal representing capstan motor armature current, means for algebraically combining said reference voltage signal, said capstan motor terminal voltage signal and said capstan motor armature current signal to provide a sum signal, and means responsive to said sum signal for providing a potential to said capstan motor to control the amplitude of the terminal voltage of said capstan motor.

4. The tape drive as claimed in claim 3 further comprising a source of constant second reference voltage of predetermined amplitude, means for applying said second reference voltage to said winding regulator in place of said capstan motor armature terminal voltage, said winding regulator responsive to said second reference voltage being applied in place of capstan armature terminal voltage for operating as a winding motor armature terminal voltage regulator in place of a winding motor armature current regulator for controlling the winding torgue exerted by said winding reel motor on said winding reel, means for disengaging said capstan motor, means for limiting the amplitude of the winding motor armature terminal voltage, a source of zero reference voltage, means for applying said zero reference voltage to said payoff regulator in place of said first reference voltage, said payoff regulator responsive to said zero reference voltage being applied in place of said first reference voltage for operating as a payoff motor armature current regulator for controlling the payoff torque exerted by said payoff motor on said payoff reel and means for limiting the amplitude of the payoff motor armature terminal voltage.

5. The tape drive as claimed in claim 3 further comprising means for stopping said tape drive comprising means for disengaging said capstan motor, and said payoff current regulator responsive to the capstan motor terminal voltage in place of said first reference voltage for stopping said payoff reel motor in a controlled manner.

6. The tape drive as claimed in claim 5 further comprising a source of zero reference voltage, a time constant circuit, and means comprising said circuit and said winding current regulator responsive to the change in polarity of said capstan motor armature terminal voltage and to said zero reference voltage in place of said capstan motor armature terminal voltage for reducing the winding torque exerted by said winding motor on said winding reel to zero in a controlled manner.

7. The tape drive as claimed in claim 4 further comprising a first time constant circuit responsive to the second reference voltage for becoming charged to a predetermined charge value, said payoff motor armature voltage regulator responsive to the charge of said time constant circuit in place of said zero reference voltage for operating as a payoff motor armature current regulator in place of a voltage regulator for stopping said payoff reel motor.

8. The tape drive as claimed in claim 7, said winding motor armature voltage regulator responsive to said zero reference voltage in place of said second reference voltage for operating as a current regulator in place of a voltage regulator, for promptly reducing the winding torque exerted by said winding motor on said winding reel to zero.

9. An arrangement according to claim 5 further comprising a time constant circuit coupled between said capstan motor armature and said payoff regulator for extending the period of application of said capstan motor terminal voltage over a sufficient length of time to insure uniform stopping of both reels.

10. An arrangement according to claim 6 wherein said last name means comprises said time constant circuit responsive to the capstan motor terminal voltage before said change in polarity for becoming charged to a predetermined value, said winding current regulator responsive to the discharge of said last named time constant circuit in place of said capstan motor armature terminal voltage, for reducing the winding torque exerted by said winding motor on said winding reel to zero in a controlled manner.

11. An arrangement according to claim 3 further comprising means for controlling the starting of said winding reel motor comprising a time constant circuit responsive to the capstan motor armature terminal voltage during startup of said capstan motor for becoming charged at a predetermined rate, said winding motor regulator responsive to the rate of charge of said time constant circuit for controlling the winding torque exerted by the winding reel motor on said winding reel during startup.

12. An arrangement according to claim 4 further comprising a time constant circuit responsive to a change in said reference voltage from a first to a zero reference for delaying the control of said payoff torque during starting of said payoff motor.

13. A tape driving comprising a direct current winding reel motor, a direct current tape capstan motor, first circuit means for driving said capstan motor at a substantially constant speed and in a first direction in response to an input reference signal of predetermined amplitude, and second circuit means for controlling the winding torque exerted by said winding reel motor as a function of the polarity and magnitude of the terminal voltage of said capstan motor.

14. An arrangement according to claim 13 further comprising a direct current payoff reel motor and third circuit means for controlling the payoff torque exerted by said payoff reel motor as a function of said input reference signal.

15. The tape drive claimed in claim 14 wherein said first circuit means comprises a source of terminal voltage for said capstan motor, said last named means comprising an input circuit for algebraically combining said input reference signal, the capstan motor terminal voltage and the capstan motor armature current to provide a sum signal, and means for controlling the amplitude of said terminal voltage as a function of said sum signal.

16. An arrangement according to claim 14 wherein said first and second circuit means operate as claimed during the startup and running of said capstan, winding and payoff reel motors, means for controlling the stopping of said motors comprising means for stopping said winding and capstan motors in response to a predetermined different amplitude of said reference signal, and means for controlling the braking torque exerted by said payoff reel motor as a function of the polarity and magnitude of the terminal voltage of said capstan motor.

17. A tape drive for winding tape from a payoff reel onto a winding reel comprising a source of a first reference signal, a direct current winding reel motor, a winding motor armature current regulator, a direct current capstan motor, a capstan motor armature counter-electromotive force regulator, said capstan regulator responsive to said reference signal and the counter-electromotive force developed by said capstan motor for driving said capstan motor at a substantially constant speed, and said winding motor regulator responsive to the terminal voltage of said capstan motor for controlling the winding torque developed by said winding reel motor.

18. An arrangement according to claim 17 further comprising a direct current payoff reel motor, a payoff motor armature current regulator, said payoff regulator responsive to said reference signal for controlling the payoff torque developed by said payoff motor.

19. The tape drive as claimed in claim 18 further comprising a source of a second reference signal, said winding regulator responsive to said second reference voltage in place of said capstan armature terminal voltage for automatically converting to a winding motor armature terminal voltage regulator from a winding motor armature current regulator for controlling the winding torque developed by said winding reel motor, means for disengaging said capstan motor, a source of third reference signal, said payoff regulator responsive to said third reference signal in place of said first reference signal for automatically converting to a payoff motor armature terminal voltage regulator from a payoff motor armature current regulator for controlling the payoff torque exerted by said payoff motor.

20. The tape drive as claimed in claim 18 further comprising means for stopping said tape drive comprising means for disengaging said capstan motor, said payoff current regulator responsive to the capstan motor terminal voltage in place of said first reference voltage for stopping said payoff reel in a controlled manner.

21. The tape drive as claimed in claim 20 comprising means responsive to a change in polarity of said capstan motor armature terminal voltage for producing a control signal, said winding current regulator responsive to said control signal for reducing the winding torque developed by said winding motor.

* * * * *